(12) United States Patent
Gorday et al.

(10) Patent No.: US 7,889,782 B2
(45) Date of Patent: Feb. 15, 2011

(54) JOINT DE-SPREADING AND FREQUENCY CORRECTION USING A CORRELATOR

(75) Inventors: Robert Mark Gorday, Wellington, FL (US); Jorge Ivonnet, Lake Worth, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 1028 days.

(21) Appl. No.: 11/678,422

(22) Filed: Feb. 23, 2007

(65) Prior Publication Data

US 2008/0205492 A1 Aug. 28, 2008

(51) Int. Cl.
*H04B 1/00* (2006.01)

(52) U.S. Cl. .................. 375/150; 375/142; 375/343; 375/344

(58) Field of Classification Search ............. 375/142, 375/147, 150, 343, 344
See application file for complete search history.

(56) References Cited

U.S. PATENT DOCUMENTS

| | | | |
|---|---|---|---|
| 4,937,775 A | 6/1990 | Engeler et al. | |
| 6,452,961 B1 * | 9/2002 | Van Wechel | 375/142 |
| 6,466,958 B1 | 10/2002 | Van Wechel et al. | |
| 6,639,937 B2 | 10/2003 | Doetsch et al. | |
| 6,771,715 B1 | 8/2004 | Rives et al. | |
| 7,016,661 B2 | 3/2006 | Gorday et al. | |
| 7,315,590 B1 * | 1/2008 | Okuyama et al. | 375/344 |
| 7,436,878 B1 * | 10/2008 | Harris et al. | 375/142 |
| 7,496,156 B2 * | 2/2009 | Lee et al. | 375/326 |
| 2004/0057503 A1 | 3/2004 | Kelley | |
| 2005/0036573 A1 | 2/2005 | Zhang et al. | |
| 2005/0074036 A1 | 4/2005 | Gorday et al. | |
| 2005/0105597 A1 | 5/2005 | Hwang et al. | |
| 2005/0202795 A1 | 9/2005 | Tian et al. | |
| 2006/0072586 A1 | 4/2006 | Callaway, Jr. et al. | |
| 2006/0093070 A1 | 5/2006 | Ibrahim et al. | |
| 2006/0200510 A1 | 9/2006 | Wang et al. | |
| 2006/0222114 A1 | 10/2006 | Lee et al. | |

* cited by examiner

*Primary Examiner*—David B Lugo

(57) ABSTRACT

A correlator (140) for de-spreading a spread-spectrum signal includes a state machine (205), a frequency correction look-up table (207), a pseudorandom code generator (209), and a correlator structure (301 and 801). The spread-spectrum signal includes symbols, and each symbol includes a plurality of chips. The correlator structure includes a plurality of taps (309 and 809) at which a coordinate rotation digital computer (CORDIC) operation is performed to determine an offset from a nominal carrier frequency of the spread-spectrum signal and to change a phase of each chip of a received symbol, in order to correct a carrier frequency of the spread-spectrum signal while de-spreading the spread-spectrum signal.

20 Claims, 8 Drawing Sheets

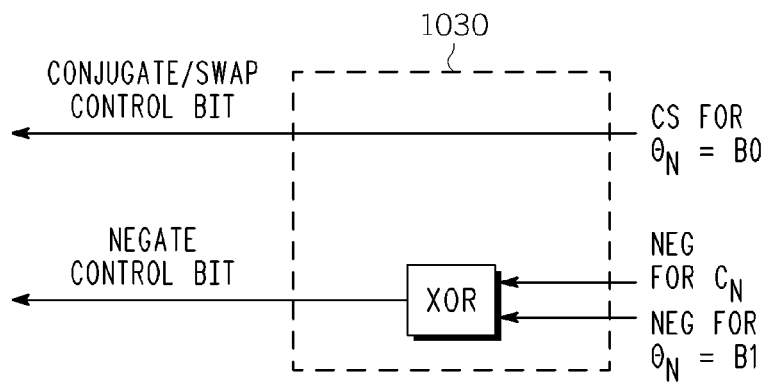
*FIG. 10*
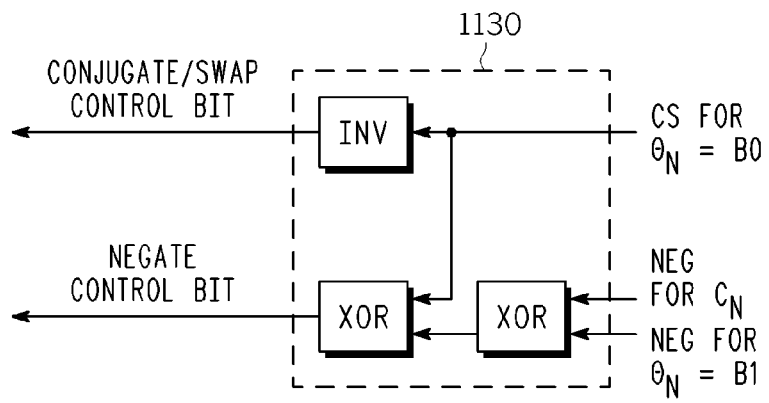
*FIG. 11*
*FIG. 12*
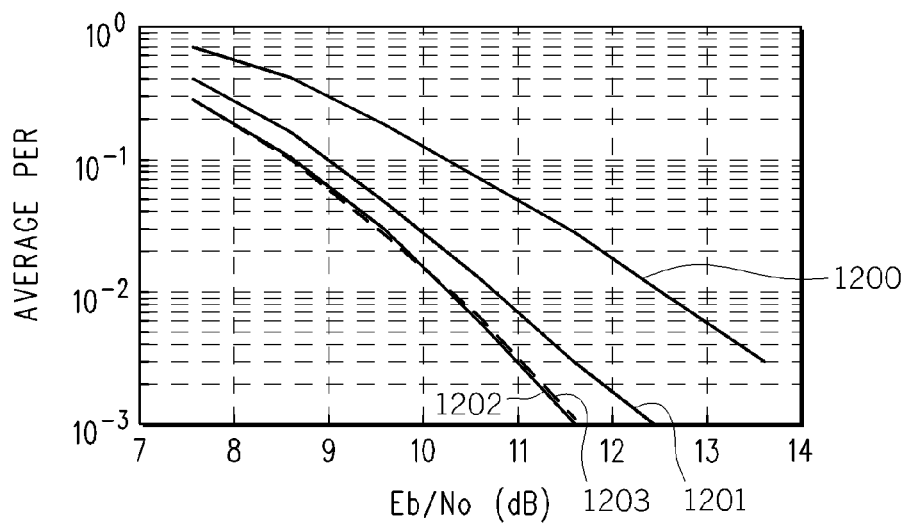

JOINT DE-SPREADING AND FREQUENCY CORRECTION USING A CORRELATOR

BACKGROUND OF THE INVENTION

1. Field of the Invention

This invention relates generally to radio frequency receivers, and more specifically to a correlator used for de-spreading a spread spectrum radio signal.

2. Related Art

Direct sequence spread spectrum (DSSS) is used in many communication systems, such as in the global positioning system (GPS); cellular protocols such as IS-95, wideband code division multiple access (WCDMA) and CDMA2000; and wireless local area network (LAN) and personal area network (PAN) protocols such as IEEE 802.11b (Wi-Fi®) and IEEE 802.15.4 (ZigBee™). The term "DSSS" used herein refers to any digital modulation scheme in which a group of M information bits is mapped at a transmitter to one N-chip codeword of a set of N-chip codewords prior to modulation using, for example, phase modulation, then de-mapped at a receiver from a received N-chip codeword to a group of M information bits during demodulation. Because the N-chip codeword has more chips than there are bits in the associated group of M information bits (i.e., N>M), the mapping and de-mapping are referred to as spreading and de-spreading, respectively.

A radio receiver typically uses a correlator to de-spread a received DSSS signal. The correlator structure is a tapped delay line, or a first-in, first-out buffer, for storing DSSS chips. A known complex correlator implementation is an N-tap correlator, with each tap having an associated tap weight, or coefficient, of $C_0$ through $C_{N-1}$. Typically, each chip of a received noisy signal is inputted to the delay line. Each chip represents a complex sample I+jQ of a received DSSS signal. The correlator receives noisy samples that are complex in general, but are sometimes real valued. The building block of a complex correlator is a tap weight operation. The tap weight operation is a quadrant rotation (i.e., a multiplication by +1, −1, +j or −j) that is applied at each tap of a correlator for de-spreading a pseudorandom (PN) code of the DSSS signal. The correlator has two adder trees, one for the real part and one for the imaginary part. In most DSSS systems, the correlator coefficients, $C_0$ through $C_{N-1}$ are binary real (±1) or binary complex (±1, ±j) valued that can also be represented using binary logical (0, 1) values.

Correlator de-spreaders that are used in DSSS receivers require a low frequency error. In complex de-spreading implementations, the correlator output is degraded if the received signal has a frequency offset. For the simple case of no frequency error and no additive receiver noise, an expected value at the output of each tap is a complex vector with magnitude $Ec*e^{j\phi}$, where Ec is the received energy per chip and $\phi$ is an arbitrary phase rotation of the received signal. In a simple case with no frequency error, the sum of all N taps is $N*Ec*\exp(j\phi)$. Expanding this simple case to include a frequency offset for the received signal, the output of each tap has a phase error represented by $e^{j\theta(n)}$. For a constant frequency error, the phase error per tap, $\theta$, is a linear function of the tap index:

$$\theta(n) = \phi + 2\pi * Fe * T_{chip} * n, \text{ for } n = 0, 1, \ldots, N-1 \quad [1]$$

where again $\phi$ is an arbitrary phase rotation of the received signal, $T_{chip}$ is the time separation between taps (chip duration), and Fe is the frequency error or frequency offset. For this case, the output of each tap is $Ec*e^{j\theta(n)}$. If $\phi$ is set to zero, the phase difference between taps is defined as $\Delta\theta = 2\pi * Fe * T_{chip}$. The sum of all N taps is given by the formula:

$$\text{correlator sum} = Ec e^{j\phi} \sum_{n=0}^{N-1} e^{j\Delta\Theta n} \quad [2]$$

with magnitude $$\text{correlator output magnitude} = Ec \left| \sum_{n=0}^{N-1} e^{j\Delta\Theta n} \right| \quad [3]$$

The summation in equation [3] has a closed form solution given by:

$$\left| \sum_{n=0}^{N-1} e^{j\Delta\Theta n} \right| = \frac{|e^{j\Delta\Theta N} - 1|}{|e^{j\Delta\Theta} - 1|} \quad [4]$$

Using Euler's identities, this can be easily re-written as $$\left| \sum_{n=0}^{N-1} e^{j\Delta\Theta n} \right| = \frac{\sin\left(\frac{\Delta\Theta N}{2}\right)}{\sin\left(\frac{\Delta\Theta}{2}\right)} \quad [5]$$

which can be substituted into equation [3] to give $$\text{correlator output magnitude} = Ec \frac{\sin\left(\frac{\Delta\Theta N}{2}\right)}{\sin\left(\frac{\Delta\Theta}{2}\right)} \quad [6]$$

When $\Delta\theta$ approaches 0, the correlator output magnitude approaches $N*Ec$. However, as $\Delta\theta$ increases, the sin(kN)/sin(k) term decreases resulting in a loss in correlator output magnitude. When additive receiver noise is present, the loss in correlator output magnitude equates to a loss of signal-to-noise ratio (SNR) at the correlator output. To limit this loss in SNR, some type of frequency correction is often used prior to the correlator to reduce the frequency error. The frequency correction prior to the correlator is accomplished using any of a variety of known methods depending on the system protocol. Accordingly, a complex correlator structure is typically preceded by a frequency correction stage. The frequency correction stage usually includes a digital oscillator ($e^{-j2\pi*fe*n}$) and a complex mixer to correct a frequency offset fe.

There are at least two known methods of performing frequency estimation and correction prior to de-spreading. Most DSSS system protocols include one of a dedicated synchronization (sync) channel that is used to acquire a frequency estimate, and a packet preamble of sufficient duration to allow frequency estimation. Then, using either method, the frequency can be corrected at a frequency correction stage prior to the correlator. The first known method of performing frequency estimation and correction prior to de-spreading, which uses a dedicated sync channel or has sync packets that are independent of the data packet, is used with the CDMA and GSM protocols. These dedicated sync channel/packets are used to estimate the frequency error, sometimes including averaging. The second known method of performing frequency estimation and correction prior to de-spreading, which uses a long preamble during which the receiver has sufficient signal processing time to estimate the frequency error, is used with the 802.11b protocol. In both methods, a frequency correction term is applied to the received data channel/packet before the packet header and payload arrive at the correlator.

The packet structure of the 802.15.4 protocol comprises a preamble of eight (8) symbols followed by a payload of up to 256 symbols. Each symbol comprises four (4) bits. Each bit comprises eight (8) DSSS chips. Each chip has a duration of 16 μsec. The 802.15.4 standard allows for a maximum clock drift of 40 ppm in a transmitter and 40 ppm in a receiver. With the 802.15.4 protocol, frequency error estimation is particularly challenging because of a large frequency error permitted by the protocol (±80 ppm or FreqError/ChipRate=±0.0975), which is random from one received packet to the next, and because of the shortness of the preamble that is available for acquiring chip sync, detecting the preamble and estimating the frequency offset.

A short preamble of the 802.15.4 protocol, combined with low SNR and low inter-symbol interference (ISI), does not provide enough time for a receiver to perform reliable frequency estimation prior to the correlator. Therefore, traditional techniques for frequency estimation and correction do not work well for a receiver receiving signals transmitted according to the 802.15.4 protocol. The low frequency error at the correlator is typically accomplished via a frequency correction operation such as an automatic frequency control (AFC) prior to the de-spreading operation. However, AFC cannot be used with 802.15.4 receivers because the preamble of the protocol is too short. Although the preamble of the 802.15.4 protocol consists of eight (8) symbols, the first four (4) codewords of which are typically distorted during a settling period of an automatic gain control of the receiver; therefore, only the last four symbols are available for AFC, which are an insufficient number of symbols.

Known techniques for frequency correction for 802.15.4 receivers require performing either differentially-coherent detection or some method of frequency correction prior to de-spreading (i.e., prior to the correlator). In some known 802.15.4 integrated circuits, frequency error effects are mitigated using differentially-coherent detection, which comprises passing the original codes through a differential detector prior to the correlator to produce a modified set of de-spreading codes, then using the modified set of de-spreading codes at the correlator. Although the differentially-coherent detection technique tolerates the ±80 ppm frequency error permitted by the 802.15.4 protocol without any frequency correction, it does so at the expense of a reduction in receive sensitivity and a reduction in multipath delay spread tolerance.

Still other known 802.15.4 receivers do not perform frequency correction at all, and, consequently, have poor link performance.

All known correlator structures in spread-spectrum receiver demodulators are used only for the sole purpose of de-spreading.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 10 illustrates a modification of a portion of the logical circuit diagram of FIG. 6;

FIG. 11 illustrates another modification of the portion of the logical circuit diagram of FIG. 6;

FIG. 12 is a graph of simulated performance of the correlator of FIG. 1;

DETAILED DESCRIPTION OF THE EXEMPLARY EMBODIMENT

Figure 1:
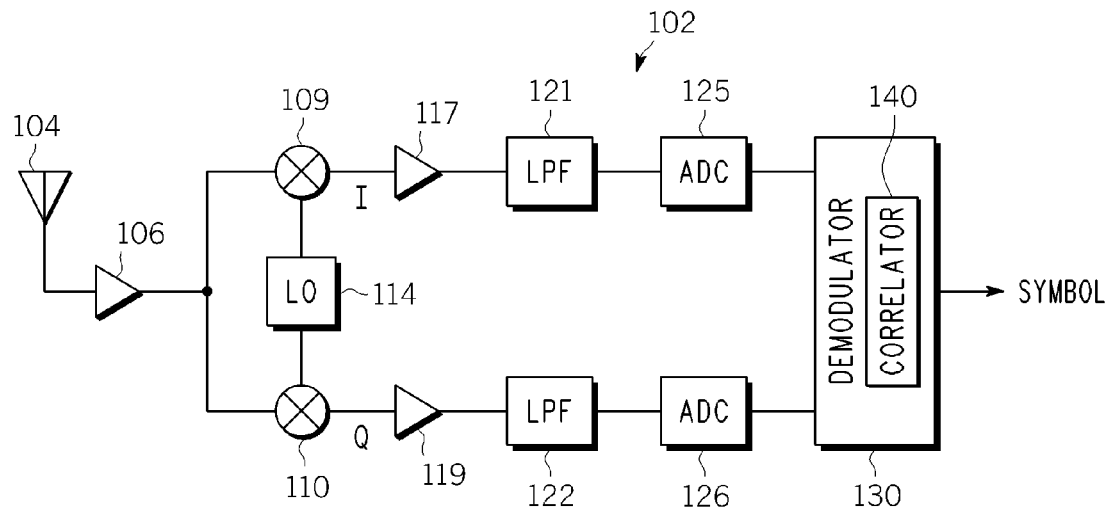
FIG. 1 is a simplified functional block diagram of a portion of a transceiver including a correlator.

FIG. 1 is a simplified functional block diagram of a portion of a transceiver 100, including a portion of a baseband receiver 102. The receiver 102 includes an antenna 104 for receiving a digitally-modulated signal, including, in particular, any coded-modulation signal such as a direct sequence spread spectrum (DSSS) signal. In an exemplary embodiment, the receiver 102 down-converts a 2.44 GHz RF signal. The received signal is amplified by a low noise amplifier 106. A mixer 109 and 110 and a local oscillator 114 split the received signal into quadrature components, I and Q. Each quadrature component is further amplified by an amplifier 117 and 119, and filtered by a lowpass filter 121 and 122 before it is digitized by an analog-to-digital converter 125 and 126. The digital samples are then inputted to a demodulator 130. The demodulator 130 comprises correlator controller, a synchronization detection unit, symbol detection logic and a complex correlator 140 (hereinafter "correlator"). The correlator 140 performs symbol decisions to recover the originally transmitted information in the received signal. The correlator 140 uses non-coherent detection to de-spread the DSSS signal. In the exemplary embodiment, the correlator 140 demodulates received 802.15.4 modulated data. By its very nature, the correlator 140 also accomplishes automatic frequency control (AFC). Advantageously, the receiver 102 does not require a separate AFC stage because frequency correction is integrated within the correlator 140.

Figure 2:
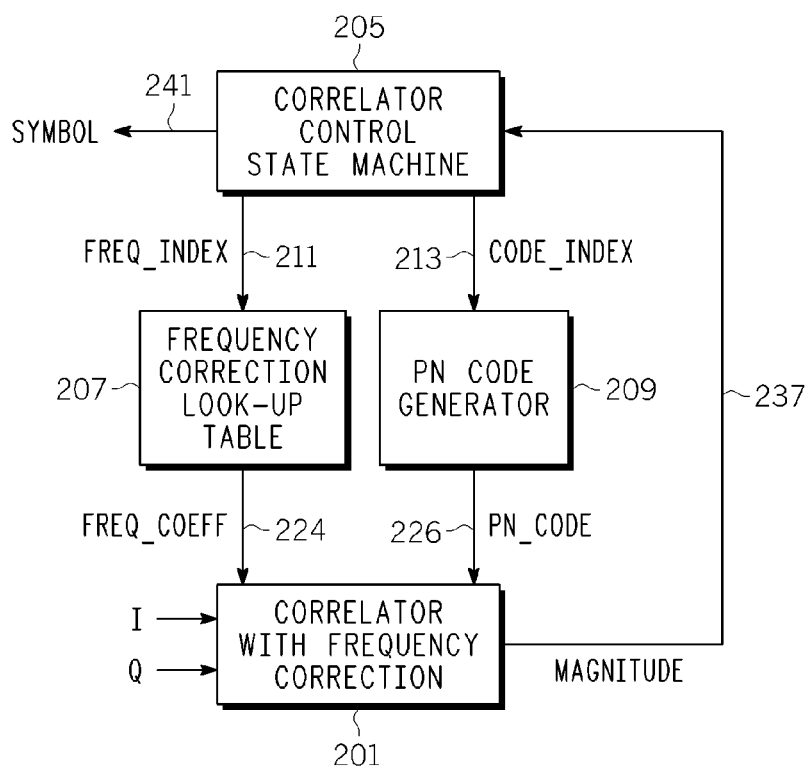
FIG. 2 is a simplified functional block diagram of the correlator of FIG. 1 including a correlator structure.

FIG. 2 is a simplified functional block diagram of relevant major blocks of the correlator 140. The correlator 140 comprises a correlator structure 201, a controller, and supporting hardware that include a frequency correction generator and a pseudorandom (PN) code generator 209. In the exemplary embodiment, the frequency correction generator is a frequency correction look-up table 207. The frequency correction look-up table 207 contains coefficients of a COordinate Rotation DIgital Computer (CORDIC) operation, which is more fully explained hereinbelow. The CORDIC coefficients in the frequency correction look-up table 207 are used to generate a plurality of phase rotations. In an exemplary embodiment, the controller is a state machine 205. The state machine 205 produces a frequency index 211 that is fed into the frequency correction look-up table 207. The state machine 205 also produces a 4-bit code index 213 that is fed into the PN code generator 209. In the exemplary embodiment, the state machine 205 produces a sequence of code indexes 213 that correspond to the sixteen (16) symbols, or codewords, in the 802.15.4 protocol. In the exemplary embodiment, the state machine 205 generates a sequence of eleven (11) frequency indexes 211. In an alternative exemplary embodiment, the state machine 205 generates a sequence of twenty-one (21) frequency indexes 211. The PN code generator 209 generates a respective 32-chip PN code from the code index 213. The frequency correction look-up table 207 generates a set of respective phase correction coefficients 224 from the frequency index 211. Alternatively, instead of using the frequency correction look-up table 207 to correct for pre-determined frequency offsets, the frequency correction generator performs a method of calculating phase correction coefficients 224 to correct for unknown frequency offsets. The frequency correction method comprises a step of determining a number of frequency offsets to correct. Next, coefficients are calculated based on a length of the PN codes. Next, the coefficients are converted to CORDIC coefficients. The resulting CORDIC coefficients are then utilized in the correlator structure 201.

The set of phase correction coefficients 224 and the PN code 226 are used within the correlator structure 201 to operate on the received I and Q samples. An output 237 from the correlator structure 201 is presented back to the state machine 205. The state machine 205 then determines a symbol 241 from the magnitude of the output 237 and from a current value of one of the frequency index 211 and the code index 213. The state machine 205 keeps the output 237 of the correlator structure 201 synchronized to a corresponding frequency index 211 and code index 213. During preamble detection, the state machine 205 performs a peak detection of the output of the correlator across all frequency indexes 211 and determines a maximum correlator peak for a particular frequency index. A best frequency index is selected based on the maximum correlator peaks over a span of symbols. After the preamble is detected and a best frequency index 211 has been determined, the best frequency index 211 is maintained constant during a remainder of the packet. During data demodulation, while the best frequency index 211 is maintained, the state machine 205 then cycles through the different code indexes 213 and selects the code index corresponding to the maximum correlator output magnitude.

Figure 3:
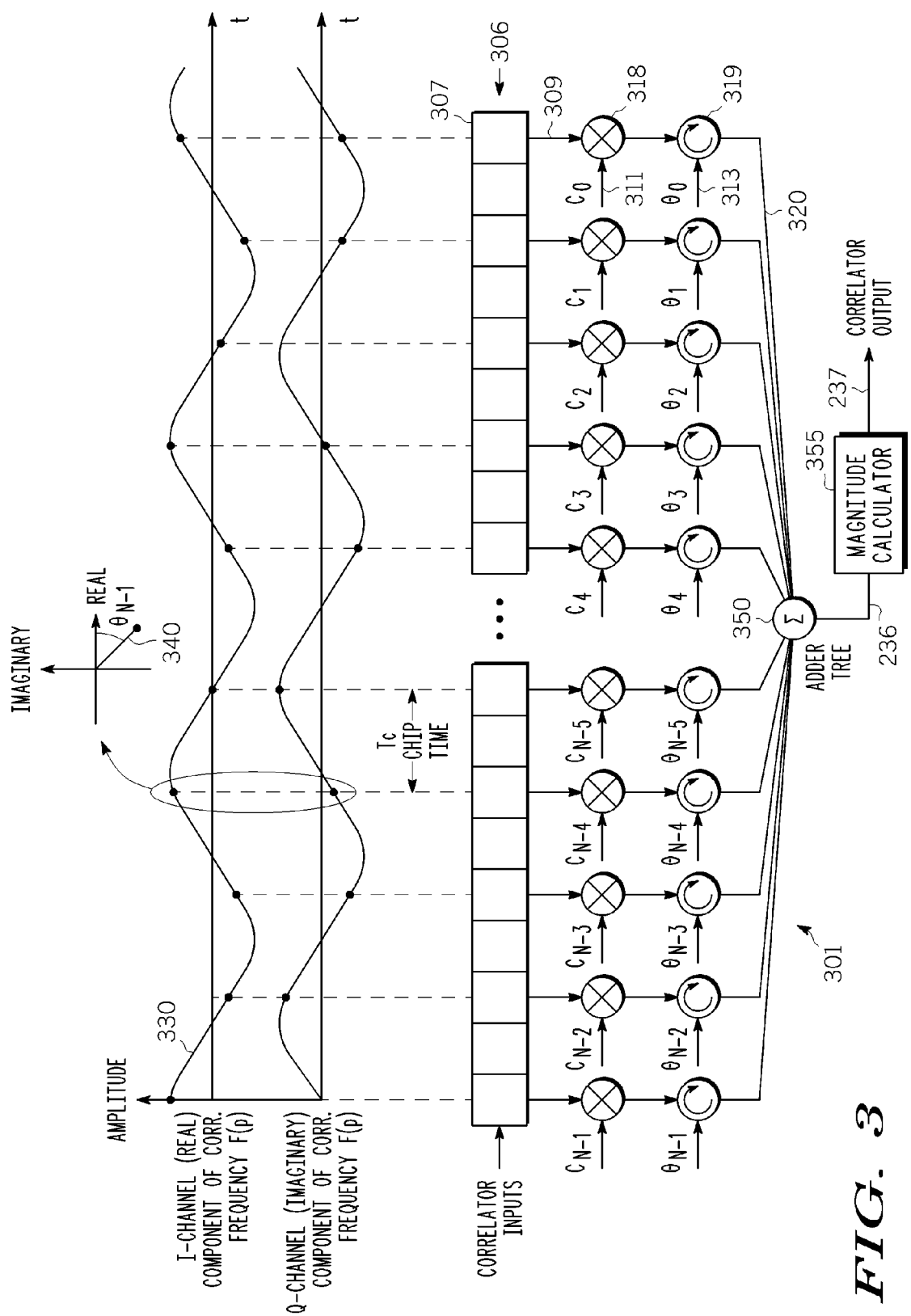
FIG. 3 is a high-level block diagram of the correlator structure of FIG. 2 including a tap, and a graphical representation of frequency correction of a received signal versus time.

FIG. 3 shows a high-level block diagram 301 of the correlator structure 201. The correlator structure 201 comprises a tapped delay line 306 having S×N−(S−1) registers 307 and N taps 309, where S is an over sampling ratio. Each tap 309 comprises a quadrant rotation 318 with an associated de-spreading code $C_0$ through $C_{N-1}$ 311, and a CORDIC phase rotation 319 with an associated phase coefficient $\theta_0$ through $\theta_{N-1}$ 313. In the exemplary embodiment, S =2; however, in general, there can be any over sampling ratio, i.e., 1N, 2N, 3N, etc. In the exemplary embodiment, the tapped delay line 306 has sixty-three (63) registers 307. In the exemplary embodiment, the tapped delay line 306 operates at 4 MHz, which is equivalent to two samples per chip time. In the exemplary embodiment, the chip time is 16 μsec. In the exemplary embodiment, the tapped delay line 306 has thirty-two (32) taps 309, i.e., a tap at every other register, which means that there is one tap 309 for each complex chip of the PN code. The de-spreading tap weights, $C_0$ through $C_{N-1}$, are variable at each tap 309. Frequency correction is defined as a time-varying phase that is inputted to each tap 309 using variables $\theta_0$ through $\theta_{N-1}$ 313. In general, the frequency correction is implemented by a phase rotation comprising a quadrant rotation followed by K stages of CORDIC rotation. An output 320 from each tap 309 is added at adder 350. A complex output 236 from the adder 350 is fed into a circuit 355 that calculates a magnitude 237 of the complex output from the adder 350. The magnitude 237 is fed into the state machine 205. An output from the state machine 205 is the symbol 241 from the correlator 201.

A received noisy signal is inputted to the tapped delay line 306 at two samples per chip. The I and Q discrete samples are first stored in registers of the tapped delay line 306. The content of each register represents a complex sample I+jQ. The output of the tapped delay line is then manipulated to perform joint de-spreading and frequency correction. This frequency-corrected output is then used to perform M-ary symbol decisions. In the exemplary embodiment, M=16. In the exemplary embodiment, the correlator operates at 48 MHz. In the exemplary embodiment, each tap has three stages. The CORDIC coefficients produce a quadrant phase rotation to 0°, 90°, 180° or 270° in the first stage. The CORDIC coefficients also produce a phase rotation of ±26° and ±14°, in the second and third stages, respectively.

An approach to improving frequency error estimation is found by recognizing that correcting a frequency error is equivalent to performing a time-varying phase correction, which needs to be phase continuous only over the length of the correlator structure 201. Frequency correction is accomplished by applying a time-varying periodic phase shift to a received complex signal, where the frequency index 211 determines a rate of change of the phase shift per sample. This approach is illustrated in FIG. 3, where a single correlator structure 201 is shown with two complex multiplies, one for de-spreading and one for phase rotation. This correlator structure 201 is time-shared to perform de-spreading at different frequency offsets using the same data, the same N de-spreading tap weights, and multiple sets of N phase rotation coefficients. In FIG. 3, the phase rotations are illustrated with a rotation symbol. In general, the phase rotations are implemented with a complex multiplier, by multiplying as follows:

$$\text{Conjugate}\{x+jy\} = |x^2+y^2| e^{-j*atan(y/x)} = Ae^{-j\theta} \qquad [7]$$

where A is a constant, and θ(n) varies from one tap to the next to achieve a specific frequency offset per equation [1], noting that the sign of the angles of the phase correction are opposite to those of the frequency error.

A complex multiplier requires four real multiplications and two additions. A same result can be obtained using the CORDIC operation. Also, when implemented in limited bitprecision, a quantization error of the x and y components results in noise in both the phase and the magnitude terms of $Ae^{-j\theta}$. The quantization error in the magnitude term will degrade the SNR at the correlator output decibel for decibel. The quantization error in the phase term has a much smaller impact that is proportional to the sin(*) of the phase error. Although the correlator structure 201 may be sensitive to amplitude errors, advantageously the CORDIC operation, by its nature, does not contribute any amplitude errors to the output of the correlator. This is because the complex phase rotation only changes the angle, and not the magnitude, of the output of the correlator structure 201. The CORDIC operation has many forms, and the most general form is an iterative form, described as follows:

Step one, quadrant rotation: Rotate by 0, $\pi/2$, $\pi$, or $3\pi/2$, so that remaining angle is within quadrant arc of $+\pi/4$ to $-\pi/4$, that is, $$[x(0)+j*y(0)]*[1,-1, j, \text{ or } -j] \quad [8]$$

Step two, CORDIC rotation: The basic CORDIC phase rotation rotates a complex number by angle $\theta_i=\text{atan}(2^{-i})$, where 'i' is a positive integer. The CORDIC operation is a simplification of a generic angle rotation formula:

$$\begin{aligned}x_2 + jy_2 &= (x_1 + jy_1)*(\cos\theta i + j\sin\theta i) \quad [9]\\ &= (x_1\cos\theta i - y_1\sin\theta i) + j*(x_1\sin\theta i + y_1\cos\theta i)\\ &= (1/\cos\theta i)*[(x_1 - y_1\tan\theta i) + j*(x_1\tan\theta i + y_1)]\\ &= (1/\cos\theta i)*[(x_1 - y_1 2^{-i}) + j*(x_1 2^{-i} + y_1)]\end{aligned}$$

where it is seen that $2^{-i}$ is a right shift by 'i' bits. As 'i' increases, the angles get smaller as shown in the following table:

| i | arctan($2^{-i}$) |
|---|---|
| 1 | 26.565 |
| 2 | 14.036 |
| 3 | 7.125 |
| 4 | 3.576 |
| 5 | 1.790 |

By performing K successive CORDIC operations with increasing 'i', any phase rotation can be approximated, with desired accuracy determined by K.

For i=1 to K $$x(i)=x(i-1)-d(i)*y(i)*2^{-i}$$

$$y(i)=y(i-1)+d(i)*x(i)*2^{-i} \quad [10]$$

where d(i)=+1 represents a positive angle rotation by $\text{atan}(2^{-i})$, and d(i)=−1 represents a negative angle rotation by $\text{atan}(2^{-i})$.

The CORDIC operation is well known to persons skilled in the art of digital signal processing as a way to implement a phase rotation of a complex number; therefore, it will not be described in further detail herein.

FIG. 3 illustrates that the complex correction frequency can be represented as a rotating complex vector, or phasor 330. By sampling the phasor 330 at chip times corresponding to the taps, a set of correction phases $\theta_n$ (n=0, 1, ..., 31) are computed. FIG. 3 illustrates that a specific correction frequency is translated into a set of phase coefficients $\theta_n$ by sampling 340 the phasor 330 that has a frequency of F(p), at sample intervals $T_C$=chip time. The method in which the structure of FIG. 3 is used relates to the lack of sufficient preamble symbols to perform traditional methods of frequency estimation and correction. The 802.15.4 preamble consists of codeword "0" repeated eight times. During preamble detection, the data coefficients $C_0$ to $C_{N-1}$ are held constant and their values are chosen to represent codeword "0", while P correlations are performed with P sets of phase coefficients $\theta_{p,0} \theta_{p,1}, \theta_{p,2}, \ldots, \theta_{p,N-1}$ (i.e., p=0, 1, ..., P−1). In the exemplary embodiment, P=11. In an alternative exemplary embodiment, P=21. The correction frequency that corresponds to the set of coefficients that produces the largest magnitude at the output of the correlator structure 201 forms an estimate of the required frequency correction. Then, during data detection, the phase coefficients are held constant using the $p^{th}$ set (optimum frequency correction), while $2^M$=16 correlations are performed using sixteen (16) sets of PN code coefficients $C_{m,0}, C_{m,1}, C_{m,2}, \ldots, C_{m,N-1}$ (i.e., m=0, 1, ..., 15) to perform 16-ary code keying demodulation of the 802.15.4 protocol.

The addition of the CORDIC stages to each tap 309 allows the correlator structure 201 to be time-shared to de-spread one signal with multiple frequency offsets, or to de-spread one signal with one frequency offset and multiple codes.

The correlator structure 201 adds CORDIC phase rotation operations to the tap weight operations performed in a traditional correlator (not shown). The correlator structure 201 provides frequency estimation and correction with minimal impact to hardware size/area, and enables the correlator structure to be used for joint frequency estimation, frequency correction, and de-spreading.

The correlator 140 performs frequency estimation and correction simultaneously with de-spreading, and, therefore, it may overcome a known problem of producing a poor quality frequency estimate caused by the brevity of the 802.15.4 preamble. The receiver 102, which includes the correlator 140, has a 4 dB better sensitivity, a 4 dB better co-channel rejection, and two-times better multipath delay spread performance.

Figure 4:
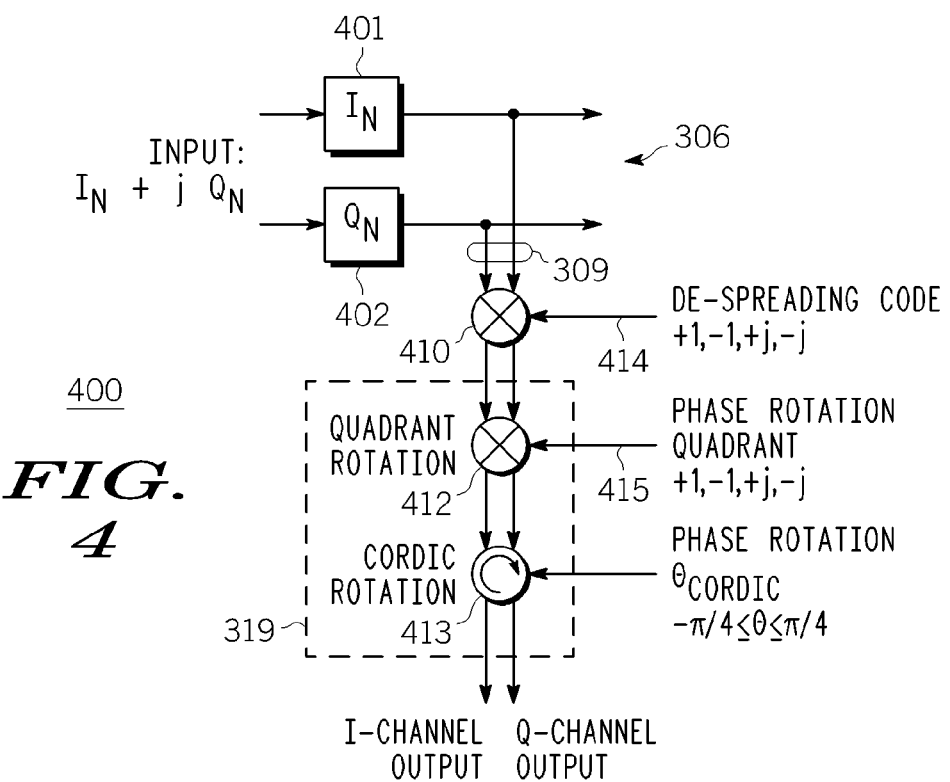
FIG. 4 is a mathematical model of the tap used in the high-level block diagram of FIG. 3.

FIG. 4 is a mathematical model 400 of one of the complex taps 309 used in the high-level block diagram 301 shown in FIG. 3. The mathematical model 400 shows the $I_N$ register 401 and the $Q_N$ register 402 of the tapped delay line 306 (which are shown as a single register 307 in FIG. 3), and the $n^{th}$ tap 309 of the tapped delay line 306. The $n^{th}$ tap 309 comprises the mathematical operations of a quadrant rotation 410 for de-spreading, and a quadrant rotation 412 and a CORDIC phase rotation 413. It should be understood that an arbitrary phase rotation can be separated into a quadrant rotation and a CORDIC rotation. The arbitrary phase rotation for frequency correction is performed by the quadrant rotation 412 and the CORDIC phase rotation 413. At the quadrant rotation 410, the $n^{th}$ chip of the de-spreading codes 414 is multiplied with the $n^{th}$ chip of the I and Q quadrature components, respectively, of the received signal, thereby producing first intermediate results. At the quadrant rotation 412, phase rotation coefficients 415 are multiplied with the I and Q first intermediate results, respectively, thereby producing second intermediate results. At the CORDIC rotation 413, the second intermediate results undergo one or more phase rotations, respectively, thereby producing the output 320 of the $n^{th}$ tap.

Figure 5:
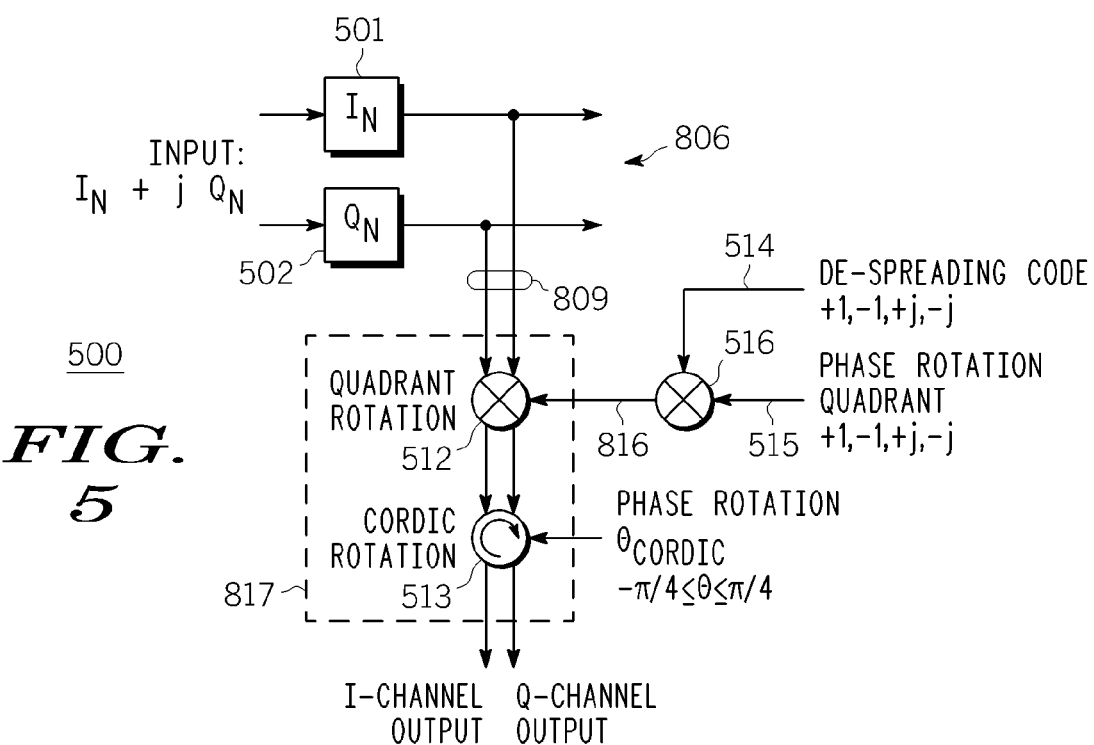
FIG. 5 is a mathematical model of the consolidated tap used in the alternative high-level block diagram of FIG. 8.
Figure 8:
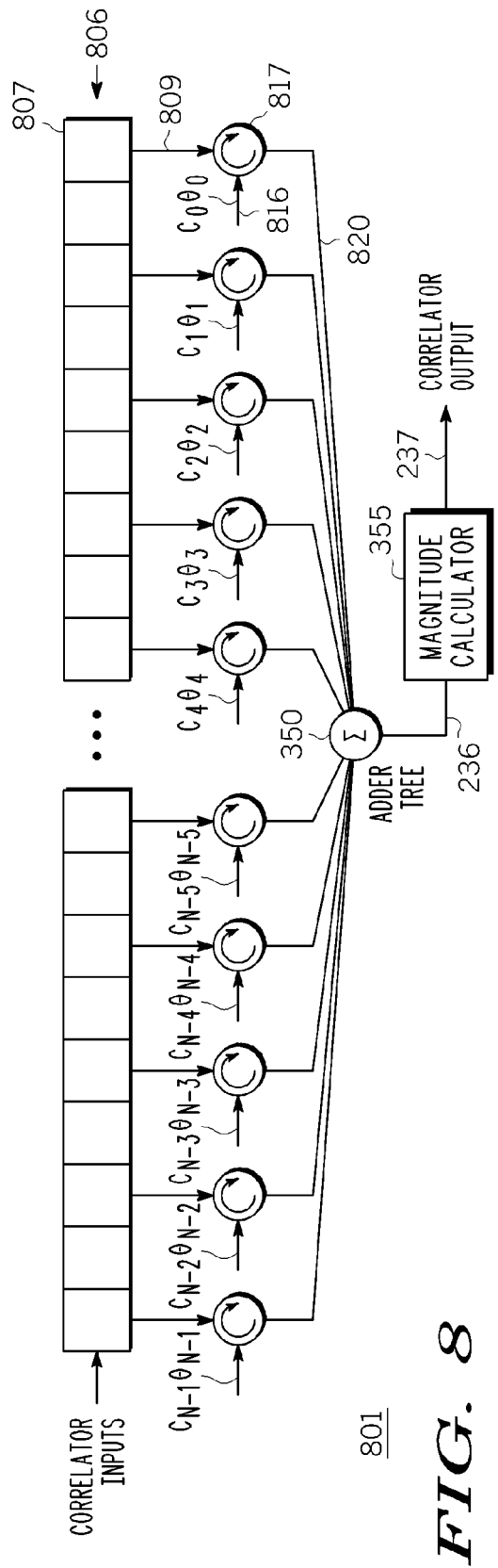
FIG. 8 is an alternative high-level block diagram of the correlator structure of FIG. 2 including a consolidated tap.

FIG. 5 is a mathematical model 500 of one of the consolidated taps 809 used in the alternative high-level block diagram 801 shown in FIG. 8. The mathematical model 500 shows the $I_N$ register 501 and the $Q_N$ register 502 of the delay line 806 (which are shown as a single register 807 in FIG. 8), and the $n^{th}$ consolidated tap 809 of the delay line 806. The $n^{th}$ consolidated tap 809 comprises the mathematical operations of a single quadrant rotation 512 and a CORDIC phase rotation 513. The single quadrant rotation 512 and the CORDIC phase rotation 513 comprise an arbitrary phase rotation. The quadrant coefficients 514 for de-spreading and the quadrant coefficients for phase rotation 515 are combined at a multiplier 516, thereby allowing the quadrant coefficients for de-spreading and the quadrant coefficients for phase rotation to advantageously share the single quadrant rotator 512. At the CORDIC rotation 513, intermediate results from the single quadrant rotation 512 undergo one or more phase rotations, respectively, thereby producing the output 820 of the $n^{th}$ tap.

Figure 6:
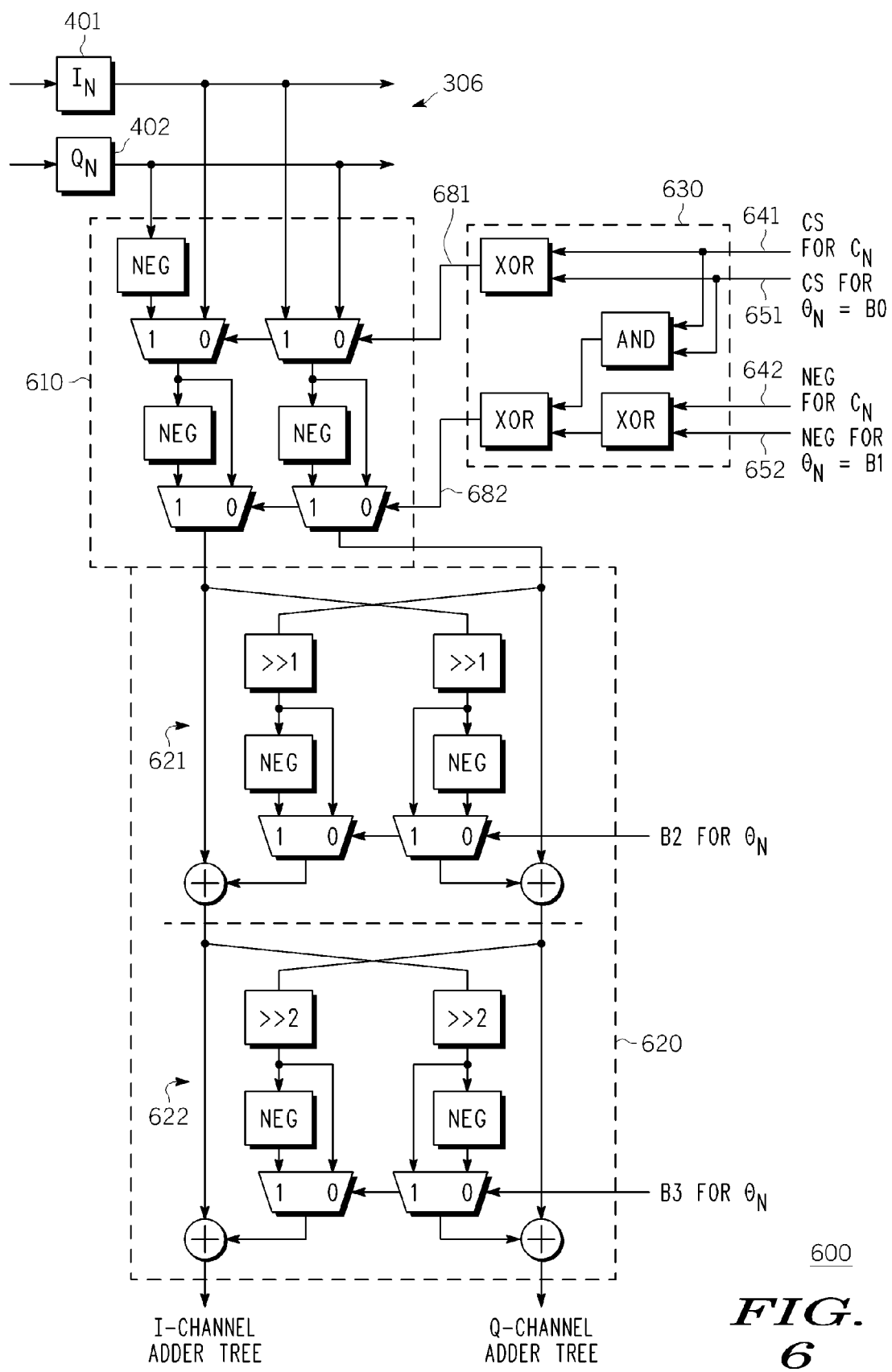
FIG. 6 is a logical circuit diagram of the consolidated tap used in the alternative correlator structure of FIG. 8.

For the correlator approach shown in FIG. 3, the sequence of recursive operations described in equation [10] can be implemented in hardware using a non-recursive, or unrolled, format as shown in FIG. 6. In this unrolled format, the first stage is a quadrant rotation (rotate by 0, $\pi/2$, $\pi$, or $3\pi/2$) and the successive stages comprise CORDIC operations. FIG. 6 illustrates the quadrant rotation followed by K=2 stages of CORDIC rotation, where the quadrant rotation is implemented using conjugate-then-swap and negate operations. Therefore, only 2+K bits per phase rotation coefficient are needed for this approach.

A CORDIC rotation requires fewer coefficients and less die area than a generic complex multiply. In addition, the magnitude of the rotated sample is scaled by a product of $1/\cos(\theta i)$, for i=1 to K, and this will be a constant that is fixed with K. Therefore, there is no quantization noise for the magnitude component of the rotation. There is quantization noise only with the phase component of the rotation, which is weighted by sin(phase error), and, therefore, contributes significantly less noise.

FIG. 6 is a logical circuit diagram 600 of one of the consolidated taps 809 used in the alternative high-level block diagram 801 for the correlator structure 201. The logical circuit diagram 600 comprises a quadrant rotation circuitry 610 followed by a two-stage CORDIC rotation circuitry 620, and an additional logic portion 630 that combines coefficients for de-spreading with coefficients for a phase quadrant rotation. In the additional logic portion 630, the binary correlator coefficients for de-spreading 641 and 642 are XOR'd with phase correction bits 651 and 652 of a quadrant rotation. As a result, the quadrant rotation circuitry 610 implements both the de-spreading and the quadrant phase correction. The two-stage CORDIC rotation circuitry 620 has a first stage 621 and a second stage 622, and performs two stages of CORDIC rotation to complete the phase correction. The two-stage CORDIC rotation circuitry 620 comprises four (4) adds, along with multiplex, negate, and shift operations. Advantageous, the two-stage CORDIC rotation circuitry 620 does not use any multiply operations, thereby saving logic circuitry. The exemplary embodiments of the tap 309 and the consolidated tap 809 have two CORDIC stages; however, in general, there could be a larger or a smaller number of CORDIC stages. The conjugate swap 641 and negate control signals 642 used for de-spreading are based upon the PN code 226. The conjugate swap 651 and negate control signals 652 used for phase quadrant rotation are based upon the frequency coefficient 224. The combined conjugate swap signal 681 is based upon both the PN code 226 and the frequency coefficient 224. The combined negate control signal 682 is based upon both the PN code 226 and the frequency coefficient 224. The values for B0, B1, B2 and B3 are based upon the frequency coefficient 224.

Figure 7:
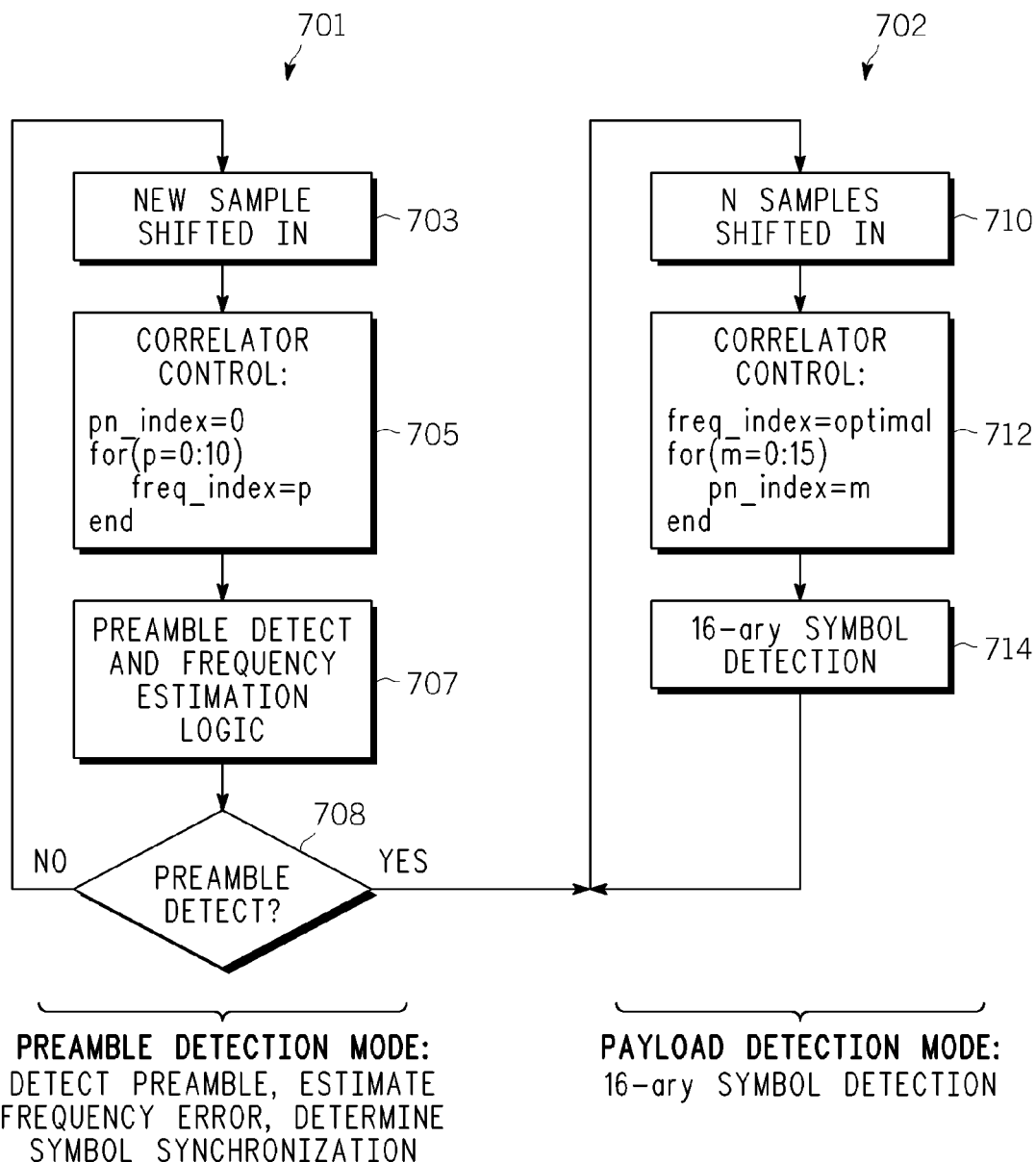
FIG. 7 is a flow diagram of operation of the correlator of FIG. 1.

FIG. 7 is a flow diagram 700 of the operation of the correlator 140. The correlator 140 easily fits into a simple correlator-control scheme, such as shown in the example flow diagram shown in FIG. 7 for an 802.15.4 packet. During the packet preamble, each set of received samples is correlated with one de-spreading code, but is repeated at different frequency offsets to find a best correlation result. Then, after the preamble is detected and an optimum frequency is estimated, each set of received samples is correlated with all sixteen (16) de-spreading codes, but with only the optimum set of frequency correction coefficients. In the exemplary embodiment, the correlator is controlled to operate in two modes. One mode is a preamble detection mode 701. The other mode is a payload detection mode 702. FIG. 7 shows how the PN code index 213 and the frequency index 211 are varied independently during preamble detection and payload, i.e., data, detection modes. The flow starts in the preamble detection mode 701. At step 703, a new sample is shifted into the tapped delay line 306. In the exemplary embodiment, at step 705, the PN index is fixed at "0" and the frequency index 211 is varied from p=0 to p=10, to determine the optimum value to compensate for the frequency error. At step 707, the sample is analyzed by preamble detect and frequency estimation logic. If the preamble is detected, step 708, the flow goes to the payload detection mode 702. If the preamble is not detected, the flow returns to step 703. At step 710, N samples are shifted into the tapped delay line 306. In the exemplary embodiment, at step 712, the frequency index 211 is held constant at the optimum value, while the PN code index 213 is varied from m=0 to m=15, to determine which of the sixteen (16) codewords, or symbols, of the 802.15.4 protocol is being received. The received codeword determination is then mapped to a set of M received information bits, step 714.

In general, for M-ary symbol detection, during preamble detection, the PN index is fixed at "0" and the frequency index 211 is varied from p=0 to p=P−1, where P is the total number of frequency corrections, to determine the optimum value to compensate for the frequency error. Then, during payload detection, the frequency index 211 is held constant at the optimum value, while the PN code index 213 is varied from m=0 to m=M−1, where M is the total number of PN codes, to determine which of the M codewords, or symbols, of the protocol is being received.

In the exemplary embodiment, during the preamble portion of the received packet, the correlator 140 is configured to de-spread only codeword "0", but at eleven (11) different frequency offsets. The preamble detection logic searches for peaks in the output of the correlator 140 that are separated at time intervals equal to the length of a codeword and that are all occurring at a same frequency offset. The frequency error estimate is calculated from the frequency correction corresponding to a strongest correlator peak. Then, during data detection, only one set of phase correction coefficients is used (corresponding to the frequency correction selected during preamble detection), and the correlator is configured to de-spread a set of received samples using all sixteen (16) possible de-spreading codes.

FIG. 8 is an alternative high-level block diagram 801 for the correlator structure 201 including a consolidated tap 809. Because the quadrant rotation used for the de-spreading coefficients is similar to the quadrant rotation used for the first stage of phase rotation, one rotation can be shared by both operations. The alternative high-level block diagram 801 comprises a delay line 806 that includes 2N registers 807 and N taps 809. Each tap 809 comprises a quadrant rotation 817 with an associated de-spreading code $C_0\theta_0$ through $C_{N-1}\theta_{N-1}$ 816. In the alternative high-level block diagram 801, the PN chips from de-spreading coefficients are XOR'd with the conjugate/swap and negate bits from the phase rotation, to form a composite signal 816 that feeds corresponding multiplex operations in a single quadrant rotation 817. This sharing saves one stage of logic (see FIG. 6). The alternative high-level block diagram 801 can be used with an 802.15.4 demodulator, and also provides a frequency offset estimate and also implements frequency offset correction. Referring now to FIGS. 5, 6 and 8, the addition of the CORDIC stages to each tap 809 allows sharing the quadrant rotation 512 by both de-spreader and phase correction coefficients. This approach enables a method of time-sharing the correlator structure 201 to de-spread a signal with one complex code and multiple frequency offsets, or to de-spread a signal with one frequency offset and multiple de-spreading codes.

Figure 9:
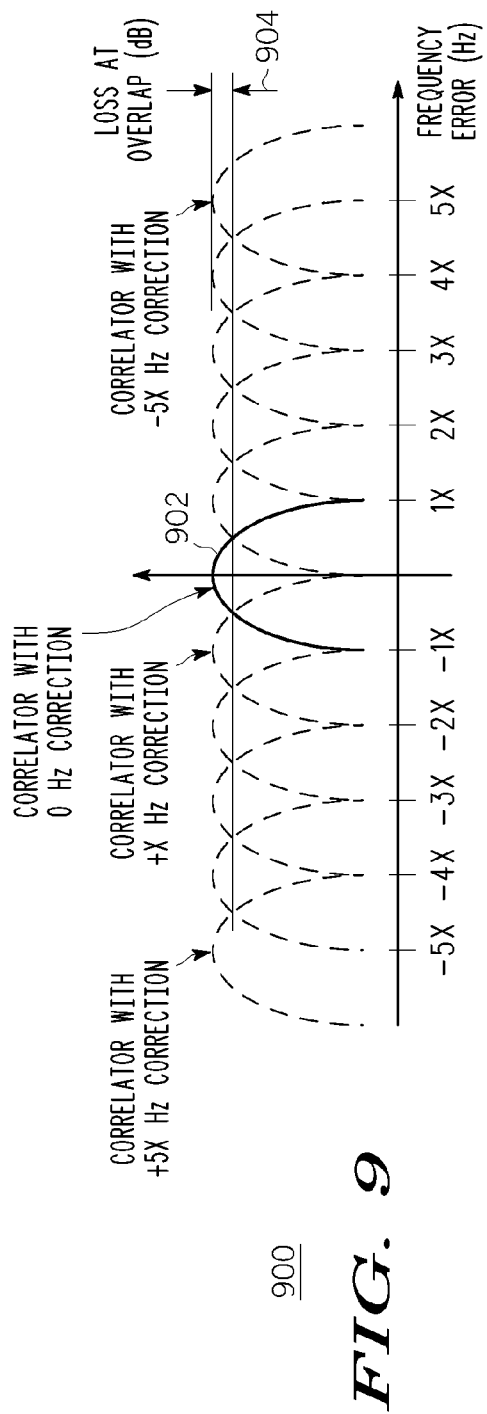
FIG. 9 is a graphical representation of a set of responses of the correlator of FIG. 1.

FIG. 9 is a graphical representation of a set of responses of the correlator 140. FIG. 9 is a graph 900 of correlator frequency response versus frequency error. The vertical axis of FIG. 9 represents power (in dB), and the horizontal axis represents frequency error, or mismatch (in Hz). FIG. 9 illustrates how the frequency response of the correlator is extended by using a set of correction frequencies, where the overlap loss is limited to a specified limit. In the exemplary embodiment, the correlator operates at a rate of twelve (12) times over-clocking compared to the clock rate of the received 802.15.4 signal, which allows the correlator to check eleven (11) frequency bins (−5X, −4X, −3X, −2X, −X, 0, +X, +2X, +3X, +4X and +5X) during the interval of time allocated to one received sample. In the exemplary embodiment, X=36.6 kHz. FIG. 9 shows the output 902 from the correlator at each of eleven (11) different, equally spaced, correction frequencies. Alternatively, the set of correction frequencies is not equally spaced. One (1) of the frequencies is at the nominal carrier frequency of 2.44 GHz, five (5) of the frequencies are at higher correction frequencies, and five (5) of the frequencies are at lower correction frequencies. In the exemplary embodiment whose graphical frequency responses are shown in FIG. 9, the overlap loss 904 is limited to 2 dB. In an alternative exemplary embodiment (not shown), the correlator checks twenty-one (21) frequency bins during the interval of time allocated to one received sample. In the alternative exemplary embodiment, one (1) of the frequencies is at the nominal carrier frequency of 2.44 GHz, ten (10) of the frequencies are at higher correction frequencies, and ten (10) of the frequencies are at lower correction frequencies. In the alternative exemplary embodiment, X=18.3 kHz. In the alternative exemplary embodiment, the overlap loss 904 is limited to 1 dB. In the alternative exemplary embodiment, the correlator structure 201 estimates the frequency offset of the received signal by selecting a nearest frequency offset to the actual frequency offset from a set of pre-determined frequency offsets: −75, −67.5, −60, −52.5, . . . , +52.5, +60, +67.5, +75 ppm (i.e., −75 ppm to +75 ppm in 7.5 ppm steps), with respect to the nominal carrier frequency of 2.44 GHz. The number N of frequency bins is not limited to eleven (11) or twenty-one (21), but can be any number greater than one (1).

FIG. 10 illustrates a modification to the additional logic portion 630 of the logical circuit diagram of FIG. 6. FIG. 11 illustrates another modification to the additional logic portion 630 of the logical circuit diagram of FIG. 6. For the 802.15.4 protocol, the spreading codes are complex with even chips (0, 2, 4, . . . , 30) being real valued ±1, and with odd chips (1, 3, 5, . . . , 31) being imaginary valued ±j. A modification is made to the CORDIC correlator structure of FIG. 6, where the odd imaginary de-spreading tap weights are hard-coded to the form j*real($C_n$) and the even real taps are hard coded to form real($C_n$). This results in a hard-coding of the ConjSwap bit for real or imaginary taps, which leads to simplifications in the logic used to combine the ConjSwap and Negate bits that control the quadrant rotation, as shown in FIGS. 10 and 11. Accordingly, in each real tap, the modified additional logic portion 1030 replaces the additional logic portion 630 shown in FIG. 6, and, in each imaginary tap, the other modified additional logic portion 1130 replaces the additional logic portion.

The exemplary embodiment of the correlator 140 operates at a chip rate of 2Mchips/sec. The chip rate, Rchip, is calculated as follows. The symbol rate for the 802.15.4 protocol is 62.5 ksymbols/sec, and $$(62.5 \text{ksymbols/sec})(4 \text{ bits/symbol}) = 250 \text{ kbits/sec} \quad [11]$$

$$(250 \text{ kbits/sec})(8 \text{ chips/bit}) = 2\text{Mchips/sec} \quad [12]$$

The center frequency is 2.44 GHz. To limit the correlator output loss to less than 2 dB requires a FreqError/ChipRate of less than 0.0114 (see point 1305 on curve 1302 in the graph of FIG. 13). From this, the maximum allowed frequency error can be calculated to be 0.0114*2 Mbps=22.8 kHz, or 22.8e3/2.44e3=9.3 ppm. In practice, other radio impairments such as oscillator phase noise and random sampling error at the A/D converter 125 and 126 further reduce this number to about 7.5 ppm.

The correlator 140 can perform frequency estimation and correction using only two symbols in the preamble. In an alternative exemplary embodiment, the correlator 140 performs frequency estimation and correction using four symbols in the preamble, for additional accuracy.

The exemplary embodiment of the correlator 140 (i.e., with a K=2 design) is implemented with approximately 24,000 gates of logic. The correlator 140 provides a benefit of approximately twice an increase in radio coverage area. Alternatively, a tradeoff could be made to give up 0.25 to 0.5 dB of performance with an embodiment that has only one CORDIC stage (i.e., K=1), which can be implemented with approximately 19,000 gates of logic.

FIG. 12 is a graph of simulation results for the exemplary embodiment of the correlator 140. The simulation results show the received packet error rate (PER) compared with the number of CORDIC stages added to the taps. FIG. 12 is a graph of PER versus energy-per-bit to noise density ratio (measured in dB). The energy-per-bit to noise density ratio is measured at the input to the receiver. The energy-per-bit to noise density ratio specifies the SNR of the incoming data into the demodulator. The PER is measured at the output of the demodulator (recovered bits), and is compared against the transmitted bits. The total number of errors is then used to calculate the PER. Link simulation results for the exemplary embodiment of the correlator are shown in FIG. 12, where PER curves were run for K=0, 1, 2, 3 and 4 stages of CORDIC rotation following the quadrant rotation. Curve 1200 represents K=0 (i.e., quadrant rotation only). Curve 1201 represents K=1. Solid-line curve 1202 represents K=2. Dotted-line curve 1203 represents K=3, 4 and ∞, which are indistinguishable from each other in FIG. 12. Dotted-line curve 1203 shows a best case. Note that the K=0 case, which requires only minimal extra hardware to a traditional correlator (XOR and quadrant phase rotation coefficients), was only 1.5 dB worse than the best case. After K=2, there is <0.1 dB improvement in performance, so K=2 was selected for the exemplary embodiment.

It was found that two CORDIC stages were sufficient for 802.15.4 receiver applications. For applications other than in an 802.15.4 receiver, it is possible that only one, or even zero, CORDIC stages are required, and the frequency correction can still be applied with a corresponding coarse quadrant phase error.

Figure 13:
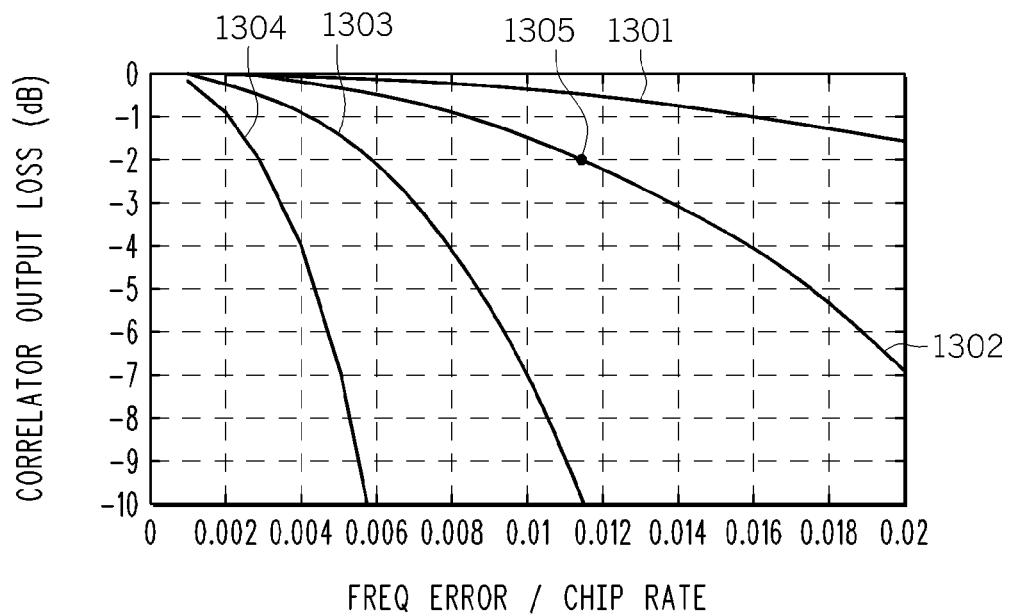
FIG. 13 is a graph of correlator output loss versus frequency error for the correlator of FIG. 1.

FIG. 13 is a graph 1300 of a simulation of correlator output loss versus frequency error for the exemplary embodiment of the correlator 140. A plot of equation [6] versus the ratio of the frequency error to chip rate, i.e., Fe/Rchip, is shown in FIG. 13 for N=16, 32, 64 and 128. Curve 1301 represents N=16. Curve 1302 represents N=32. Curve 1303 represents N=64. Curve 1304 represents N=128. In the exemplary embodiment, N=32.

Figure 14:
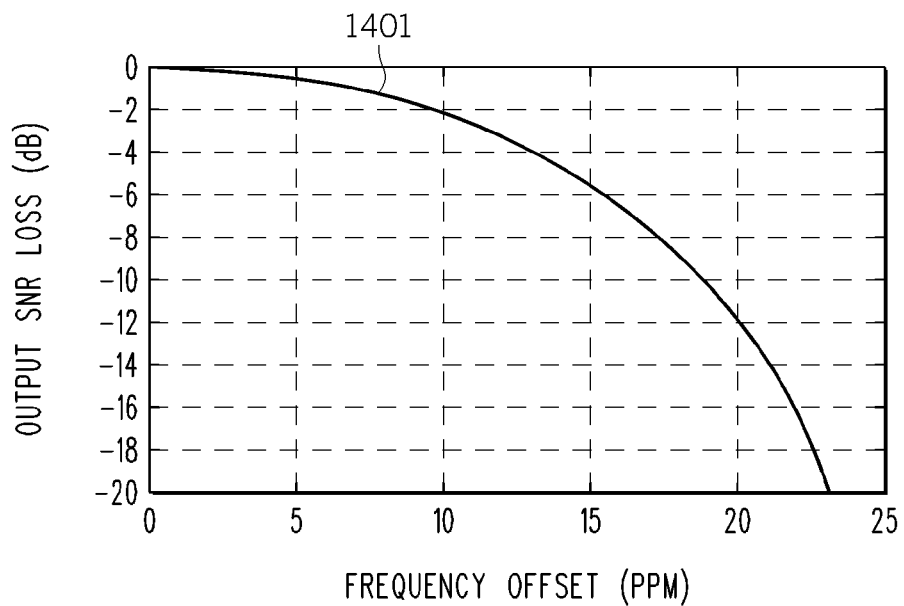
FIG. 14 is a graph of output signal-to-noise loss of a 32-tap correlator versus frequency offset for the transceiver of FIG. 1.

FIG. 14 is a graph 1400 of a simulation of output signal-to-noise loss of a 32-tap correlator versus frequency offset for the receiver 102. A plot 1401 of the output SNR loss from a 32-tap correlator versus frequency offset is shown in FIG. 14.

The correlator 140 provides an area/cost efficient method to perform joint de-spreading and frequency correction, which improves sensitivity and multipath performance. Utilizing the exemplary embodiment of the correlator 140 in an integrated circuit for an 802.15.4 radio re-claims the 4 dB sensitivity, and improves delay spread performance by two times. An additional benefit of the CORDIC operation is that quantization noise caused by a small number of CORDIC stages only adds phase noise, and not magnitude noise, to the output of the correlator 140.

Although the CORDIC operation can produce phase rotations of up to 180°, the exemplary embodiment of the correlator 140 uses the CORDIC operation to produce phase rotations of only up to 90°. However, in an alternative exemplary embodiment of the correlator 140 that has real PN codes, as opposed to imaginary PN codes, the CORDIC operation is used to produce 180° phase rotations. For embodiments having real PN codes (wherein de-spreading involves a multiplication by ±1, which is equivalent to a rotation by 0° or 180°), the frequency correction phase rotation is divided into two stages. One stage is a 0° or a 180° rotation, and the other stage is a <180° CORDIC rotation. In this case, the ±1 real PN code is combined with the first stage ±1 code of the frequency-correction phase rotation. The first stage can be implemented by adding an i=0 stage CORDIC phase rotation to equation [10].

An alternative approach to performing frequency estimation and correction is to implement a bank of correlators structures (not shown) where the frequency into each correlator structure is corrected to one of a set of frequencies separated by 2×7.5=15 ppm. This alternative approach uses eleven (11) FIFO buffers and correlator structures, each with a different frequency correction block in front (−75, −60, −45, −30, −15, 0, +15, +30, +45, +60 and +75 ppm). Eleven (11) different correlator structures allow simultaneous preamble detection on eleven (11) different frequencies, and the correlator structure with the highest magnitude output indicates a frequency offset estimate. In this alternative approach, one correlator structure cannot be time-shared because each has a different frequency correction feeding it.

A second alternative approach is to duplicate the entire correlator (memory, quadrant rotator, and adder trees) and add a frequency correction block (not shown) at the input to the correlator. This requires an increase in hardware and power consumption.

A third alternative approach is to use a conventional complex multiplier (not shown) to accomplish the phase correction at each tap. This requires four (4) real multiplies, more hardware than the CORDIC approach, and quantization noise is added to both magnitude and phase of the correlator output.

It should be understood that all circuitry described herein may be implemented either in silicon or another semiconductor material or alternatively by software code representation of silicon or another semiconductor material.

Although the invention is described herein with reference to specific embodiments, various modifications and changes can be made without departing from the scope of the present invention as set forth in the claims below. For instance, although the exemplary embodiments show that the quadrant rotation for de-spreading occurs prior to the CORDIC rotations for frequency correction, these operations could take place in a reverse order. Also, although the exemplary embodiments show that the larger CORDIC rotation occurs prior to the smaller CORDIC rotation, these rotations could occur in a reverse order. Although the exemplary embodiment of the receiver 102 operates in the 2.44 GHz band, the invention is applicable with a receiver that operates at other frequency bands. Although the exemplary embodiment of the correlator 140 de-spreads a DSSS signal, the invention is applicable to other types of spread-spectrum signals. Although the exemplary embodiment is for use in an 802.15.4 system, which does not have a dedicated synchronization channel, the invention could also be used to improve receiver performance in a system where there is a dedicated synchronization channel (e.g. cellular).

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A correlator for de-spreading a digitally-modulated signal including a plurality of symbols, each symbol spread among a plurality of chips, the digitally-modulated signal having a nominal carrier frequency, the correlator comprising:

a tapped delay line including a plurality of registers, each register for holding a chip of a symbol of the digitally-modulated signal as a function of time;

a frequency correction generator for outputting a plurality of sets of phase rotation tap weights to the tapped delay line, each set of phase rotation tap weights corresponding to a frequency offset of an actual carrier frequency of the digitally-modulated signal from the nominal carrier frequency; and taps operatively coupled to registers for performing a tap weight operation on each chip to rotate a phase of each chip to correct the frequency offset from the nominal carrier frequency and for performing another tap weight operation on each chip to de-spread the digitally-modulated signal.

2. The correlator of claim 1, in which the digitally-modulated signal is a direct sequence spread spectrum (DSSS) signal.

3. The correlator of claim 2, in which the DSSS signal is a signal having a packet structure in conformance with an 802.15.4 protocol.

4. The correlator of claim 1, in which the taps implement a coordinate rotation digital computer (CORDIC) operation.

5. The correlator of claim 1, in which the digitally-modulated signal includes a preamble and a payload, and in which the tap weight operation on each chip to rotate the phase of each chip to correct the frequency offset from the nominal carrier frequency is performed on symbols of the preamble.

6. The correlator of claim 1, in which the digitally-modulated signal includes a preamble and a payload, and in which the tap weight operation on each chip to rotate the phase of each chip to correct the frequency offset from the nominal carrier frequency and the other tap weight operation on each chip to de-spread the digitally-modulated signal, are performed on symbols of the payload.

7. A method of operating a correlator in a receiver, the receiver receiving a coded-modulation spread spectrum signal including a plurality of symbols, the coded-modulation spread spectrum signal having a nominal carrier frequency and a packet structure comprising a preamble followed by a payload, comprising the steps of:
  during reception of a preamble, correlating a received symbol with a same de-spreading code a plurality of times, each correlation performed at a different frequency offset from the nominal carrier frequency, to determine an indication of an actual carrier frequency of the received coded-modulation spread spectrum signal; and
  based upon the actual carrier frequency determined, selecting a plurality of tap weights for the correlator to compensate for the actual carrier frequency of the coded-modulation spread spectrum signal.

8. The method of claim 7, wherein the correlator uses a coordinate rotation digital computer (CORDIC) operation a plurality of times during the preamble to determine the indication of the actual carrier frequency of the coded-modulation spread spectrum signal.

9. The method of claim 7, in which the coded-modulation spread spectrum signal is a signal having a packet structure in conformance with an 802.15.4 protocol.

10. The method of claim 7, including the step of:
  during reception of a payload, correlating each received symbol with both a plurality of de-spreading codes and the plurality of tap weights, to de-spread and correct the frequency of the coded-modulation spread spectrum signal.

11. The method of claim 10, in which the correlating during reception of the payload includes using a coordinate rotation digital computer (CORDIC) operation to correct the frequency of the coded-modulation spread spectrum signal.

12. The method of claim 10, in which the correlating during reception of the payload includes using a coordinate rotation digital computer (CORDIC) operation to both correct the frequency of the coded-modulation spread spectrum signal and to de-spread the coded-modulation spread spectrum signal.

13. A correlator for de-spreading a direct sequence spread spectrum (DSSS) signal, the DSSS signal including symbols, the DSSS signal having a nominal carrier frequency, the correlator comprising:
  a correlator structure having a plurality of taps, each tap having a tap weight;
  a frequency correction generator for outputting a plurality of sets of phase rotation tap weights, each set of phase rotation tap weights corresponding to a pre-determined offset of an actual carrier frequency of the DSSS signal from the nominal carrier frequency;
  a pseudorandom code generator for outputting a plurality of sets of de-spreading tap weights, each set of de-spreading tap weights corresponding to a pre-determined pseudorandom code for de-spreading the DSSS signal; and
  a controller for selectively controlling application of the sets of de-spreading tap weights and the phase rotation tap weights to the taps.

14. The correlator of claim 13, in which the tap weights outputted by the pseudorandom code generator include coordinate rotation digital computer (CORDIC) coefficients.

15. The correlator of claim 14, in which the taps change the phase of the DSSS signal, to compensate for the pre-determined offset of the actual carrier frequency of the DSSS signal from the nominal carrier frequency.

16. The correlator of claim 13, in which the correlator correlates, using one set of the plurality of sets of de-spreading tap weights and sequentially each set of the plurality of sets of phase rotation tap weights, a symbol of the DSSS signal.

17. The correlator of claim 13, in which the correlator correlates, using one set of the plurality of sets of phase rotation tap weights and sequentially each set of the plurality of sets of de-spreading tap weights, a symbol of the DSSS signal.

18. The correlator of claim 13, in which the DSSS signal is a signal having a packet structure in conformance with an 802.15.4 protocol.

19. The correlator of claim 18, in which the DSSS signal has a clock rate and the correlator operates at a higher clock rate than the clock rate of the DSSS signal.

20. The correlator of claim 13, in which the frequency correction generator calculates phase correction coefficients to correct for unknown frequency offsets.

* * * * *